US012608443B2

(12) United States Patent
Abhilash et al.

(10) Patent No.: US 12,608,443 B2
(45) Date of Patent: Apr. 21, 2026

(54) SYSTEM AND METHOD FOR TRAINING REGION SELECTION FOR DEEP LEARNING MODELS

(71) Applicant: UPTIMEAI TECH PRIVATE LIMITED, Bengaluru (IN)

(72) Inventors: Chintada Abhilash, Visakhapatnam (IN); Jagadish Gattu, San Ramon, CA (US); Vamsi Yalamanchili, Bengaluru (IN)

(73) Assignee: UPTIMEAI TECH PRIVATE LIMITED (IN)

( * ) Notice: Subject to any disclaimer, the term of this patent is extended or adjusted under 35 U.S.C. 154(b) by 0 days.

(21) Appl. No.: 18/944,126

(22) Filed: Nov. 12, 2024

(65) Prior Publication Data

US 2026/0073015 A1     Mar. 12, 2026

(30) Foreign Application Priority Data

Sep. 10, 2024    (IN) .............................. 202441068361

(51) Int. Cl.
| | |
|---|---|
| *G06F 18/00* | (2023.01) |
| *G06F 18/213* | (2023.01) |
| *G06F 18/22* | (2023.01) |
| *G06F 18/23* | (2023.01) |

(52) U.S. Cl.
CPC ............ *G06F 18/213* (2023.01); *G06F 18/22* (2023.01); *G06F 18/23* (2023.01)

(58) Field of Classification Search
None
See application file for complete search history.

(56) References Cited

U.S. PATENT DOCUMENTS

| | | | | |
|---|---|---|---|---|
| 10,936,620 B2 * | 3/2021 | M | ......................... | G06F 16/345 |
| 11,128,667 B2 * | 9/2021 | Shivamoggi | .......... | G06F 16/287 |
| 2013/0268465 A1 | 10/2013 | McConnell | | |
| 2020/0320413 A1 * | 10/2020 | Deng | ........................ | G06F 7/14 |
| 2021/0365478 A1 * | 11/2021 | Mopur | .............. | G06F 18/24137 |
| 2022/0101069 A1 * | 3/2022 | Jia | ........................ | G06V 10/764 |

(Continued)

FOREIGN PATENT DOCUMENTS

| | | |
|---|---|---|
| CN | 107194917 B | 7/2020 |
| CN | 116069964 A | 5/2023 |

*Primary Examiner* — Farhan M Syed
(74) *Attorney, Agent, or Firm* — Jason C. Cameron

(57)     ABSTRACT

System and method for automatic selection of training region selection for deep learning model is disclosed. An identification module 110 identifies equipment shutdowns and excludes buffer region data. A segmentation module 120 estimates operational regions and divides data into predefined operating regions using K-means clustering. A feature analysis module 130 determines top contributing tags and identifies low and high values within operational regions. A domain comparison module 140 compares contributing tags with domain knowledge, excluding regions associated with mapped failures. A data cleaning module 150 ensures data integrity by recalculating statistical measures and eliminating outliers. A filtering module 160 refines data and consolidates regions to reduce training ranges. This integrated approach enhances equipment monitoring and predictive analytics, enabling proactive maintenance strategies and optimizing operational efficiency.

10 Claims, 3 Drawing Sheets

(56) References Cited

U.S. PATENT DOCUMENTS

| | | | |
|---|---|---|---|
| 2023/0230338 A1* | 7/2023 | Prochnow | G06Q 50/02 |
| | | | 382/103 |
| 2024/0004913 A1* | 1/2024 | Yuan | G06F 18/22 |

* cited by examiner

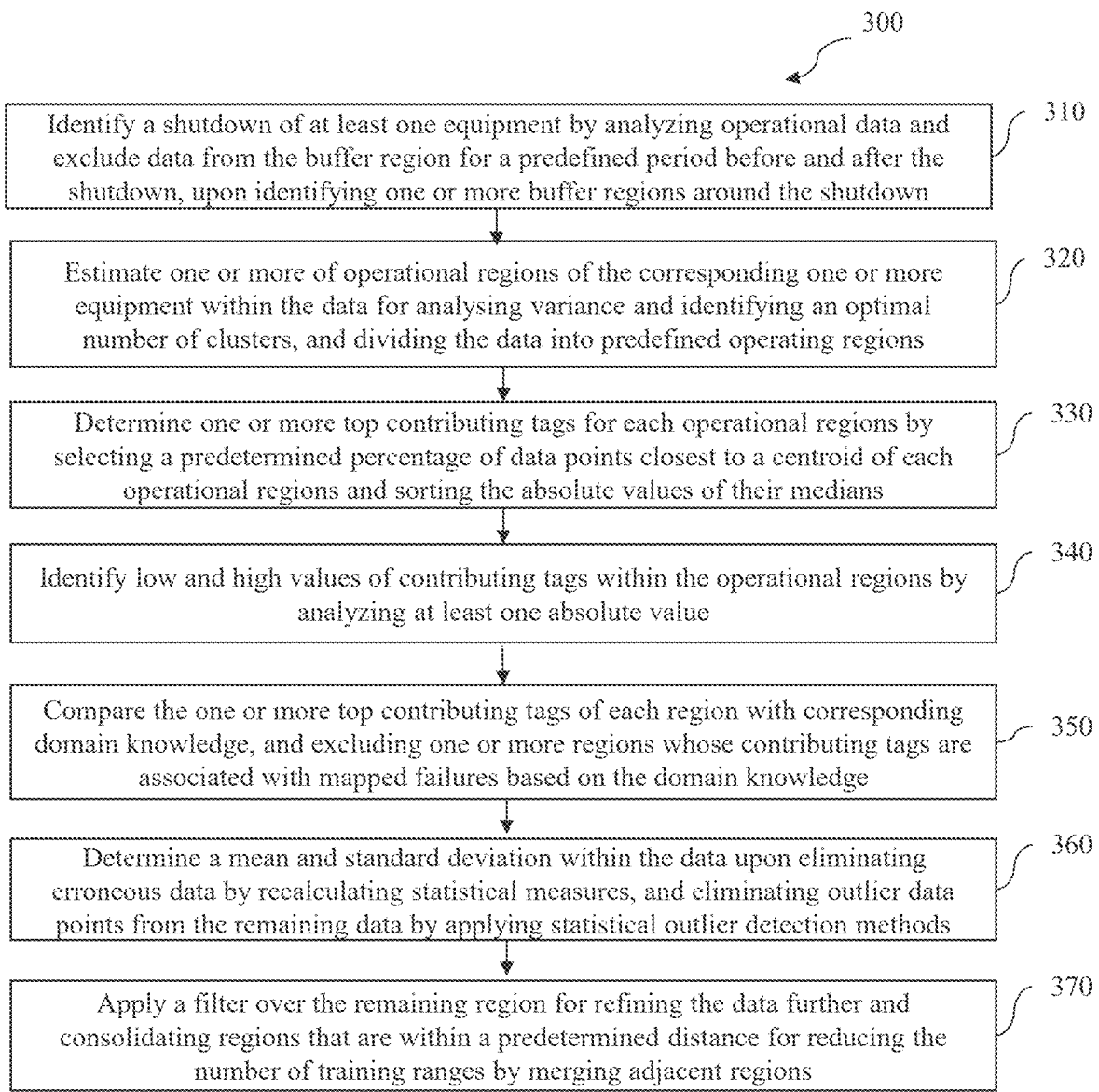

300

Identify a shutdown of at least one equipment by analyzing operational data and exclude data from the buffer region for a predefined period before and after the shutdown, upon identifying one or more buffer regions around the shutdown

310

Estimate one or more of operational regions of the corresponding one or more equipment within the data for analysing variance and identifying an optimal number of clusters, and dividing the data into predefined operating regions

320

Determine one or more top contributing tags for each operational regions by selecting a predetermined percentage of data points closest to a centroid of each operational regions and sorting the absolute values of their medians

330

Identify low and high values of contributing tags within the operational regions by analyzing at least one absolute value

340

Compare the one or more top contributing tags of each region with corresponding domain knowledge, and excluding one or more regions whose contributing tags are associated with mapped failures based on the domain knowledge

350

Determine a mean and standard deviation within the data upon eliminating erroneous data by recalculating statistical measures, and eliminating outlier data points from the remaining data by applying statistical outlier detection methods

360

Apply a filter over the remaining region for refining the data further and consolidating regions that are within a predetermined distance for reducing the number of training ranges by merging adjacent regions

SYSTEM AND METHOD FOR TRAINING REGION SELECTION FOR DEEP LEARNING MODELS

EARLIEST PRIORITY DATE

This Application claims priority from a complete patent application filed in India having Patent Application No. 202441068361, filed on 10 Sep. 2024, and titled "SYSTEM AND METHOD FOR TRAINING REGION SELECTION FOR DEEP LEARNING MODELS".

FIELD OF INVENTION

Embodiments of the present disclosure relate to the field of predictive analytics and anomaly detection in equipment monitoring using deep learning models, and more particularly, a system and method for training region selection for deep learning model.

BACKGROUND

Deep learning-based techniques have gained significant traction in the realm of anomaly detection and equipment monitoring due to their capability to learn intricate patterns from vast amounts of data. These techniques leverage the power of deep neural networks to process billions of data points, identifying subtle deviations that could indicate potential failures or inefficiencies in equipment performance. Despite their effectiveness, a critical challenge persists in the selection of training regions for these deep learning models.

Selecting appropriate training regions is essential for the accuracy and reliability of the models. Traditionally, this task has been the responsibility of the customers, who are expected to specify which regions represent ideal operating conditions for model training. However, customers often lack the necessary information and expertise to make these determinations. This gap not only makes the training region selection process time-consuming but also highly prone to errors.

In conventional methods, operation engineers manually review the data to select training regions. This process involves examining each tag (or sensor) within the system to identify alerts or underperforming regions. Given the complexity and volume of data, this manual approach is exceedingly time-consuming, often requiring several man-hours per system. Systems with tag counts ranging from tens to thousands exacerbate this challenge. To simplify the process, some solutions limit the number of sensors, or the amount of data considered. However, even when focusing on a limited number of critical tags, the review process can still exceed an hour per system. This significant time investment impedes the swift development and deployment of models.

Another conventional method relies on the judgment of operation engineers to select training regions. This method introduces considerable variability as engineers' selections are influenced by their individual risk preferences and understanding of the domain. Engineers need to have substantial domain knowledge and expertise in interpreting sensor data to make informed decisions. This human element introduces bias and inconsistency, resulting in challenges in achieving reproducible training regions and developing generalized models. The variability can lead to suboptimal training regions, ultimately affecting the accuracy and reliability of the models. Consequently, models trained on these regions may fail to generate accurate alerts when needed, undermining the effectiveness of the predictive analytics solution.

Hence, there is a need for an improved system and method for training region selection for deep learning model, which addresses the aforementioned issue(s).

OBJECTIVE OF THE INVENTION

An objective of the present invention is to develop a sophisticated system and method for improved equipment monitoring through intelligent data analysis.

Another objective of the present invention is to optimize predictive analytics by accurately selecting training regions for deep learning models.

Another objective of the present invention is to accurately identify equipment shutdowns by analyzing operational data and excluding buffer region data.

Another objective of the present invention is to estimate and segment operational regions within the data using advanced machine learning techniques such as K-means clustering.

Another objective of the present invention is to enhance predictive maintenance strategies, reduce downtime, minimize errors, and boost overall operational productivity by leveraging advanced data analysis and domain knowledge integration.

BRIEF DESCRIPTION

In accordance with an embodiment of the present disclosure, a system for training region selection for deep learning model is provided. The system includes a processing subsystem hosted on a server. The processing subsystem is configured to execute on a network to control bidirectional communications among a plurality of modules. The processing subsystem includes an identification module which is configured to identify a shutdown of at least one equipment by analyzing operational data and exclude data from the buffer region for a predefined period before and after the shutdown, upon identifying one or more buffer regions around the shutdown. The processing subsystem also includes a segmentation module operatively coupled to the identification module. The segmentation module is configured to estimate one or more of operational regions of the corresponding one or more equipment within the data to analyze variance and identify an optimal number of clusters and divide the data into predefined operating regions using K-means clustering technique based on the estimated number of operational regions. Further, the processing subsystem includes a feature analysis module operatively coupled to the segmentation module. The feature analysis module is configured to: determine one or more top contributing tags for each operational regions by selecting a predetermined percentage of data points closest to a centroid of each operational regions and sort the absolute values of their medians; and to identify low and high values of contributing tags within the operational regions by analyzing at least one absolute value. The processing subsystem also includes a domain comparison module operatively coupled to the feature analysis module. The domain comparison module is configured to compare the one or more top contributing tags of each region with corresponding domain knowledge and exclude one or more regions whose contributing tags are associated with mapped failures based on the domain knowledge. Furthermore, the processing subsystem includes a data cleaning module operatively coupled to the domain comparison module. The data cleaning module is configured to determine a mean and standard deviation within the data upon eliminating erroneous data by recalculating statistical measures and eliminate outlier data points from the remaining data by applying statistical outlier detection methods. The processing subsystem further includes a filtering module operatively coupled to the data cleaning module. The filtering module is configured to apply a filter over the remaining region to refine the data further and consolidate regions that are within a predetermined distance to reduce the number of training ranges by merging adjacent regions.

In accordance with another embodiment of the present disclosure, a method for training region selection for deep learning model. The method includes identifying a shutdown of at least one equipment by analyzing operational data and exclude data from the buffer region for a predefined period before and after the shutdown, upon identifying one or more buffer regions around the shutdown. The method also includes estimating one or more of operational regions of the corresponding one or more equipment within the data for analysing variance and identifying an optimal number of clusters, and dividing the data into predefined operating regions using K-means clustering technique. Furthermore, the method includes determining one or more top contributing tags for each operational regions by selecting a predetermined percentage of data points closest to a centroid of each operational regions and sorting the absolute values of their medians. The method also includes identifying low and high values of contributing tags within the operational regions by analyzing at least one absolute value. The method also includes comparing the one or more top contributing tags of each region with corresponding domain knowledge, and excluding one or more regions whose contributing tags are associated with mapped failures based on the domain knowledge. Further, the method includes determining a mean and standard deviation within the data upon eliminating erroneous data by recalculating statistical measures and eliminating outlier data points from the remaining data by applying statistical outlier detection methods. The method also includes applying a filter over the remaining region for refining the data further and consolidating regions that are within a predetermined distance for reducing the number of training ranges by merging adjacent regions.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 3 illustrates a flow chart representing the steps involved in a method for training region selection for deep learning model.

Figure 1:
FIG. 1 is a block diagram representation of a system for training a region selection for deep learning model in accordance with an embodiment of the present disclosure.
Figure 1:
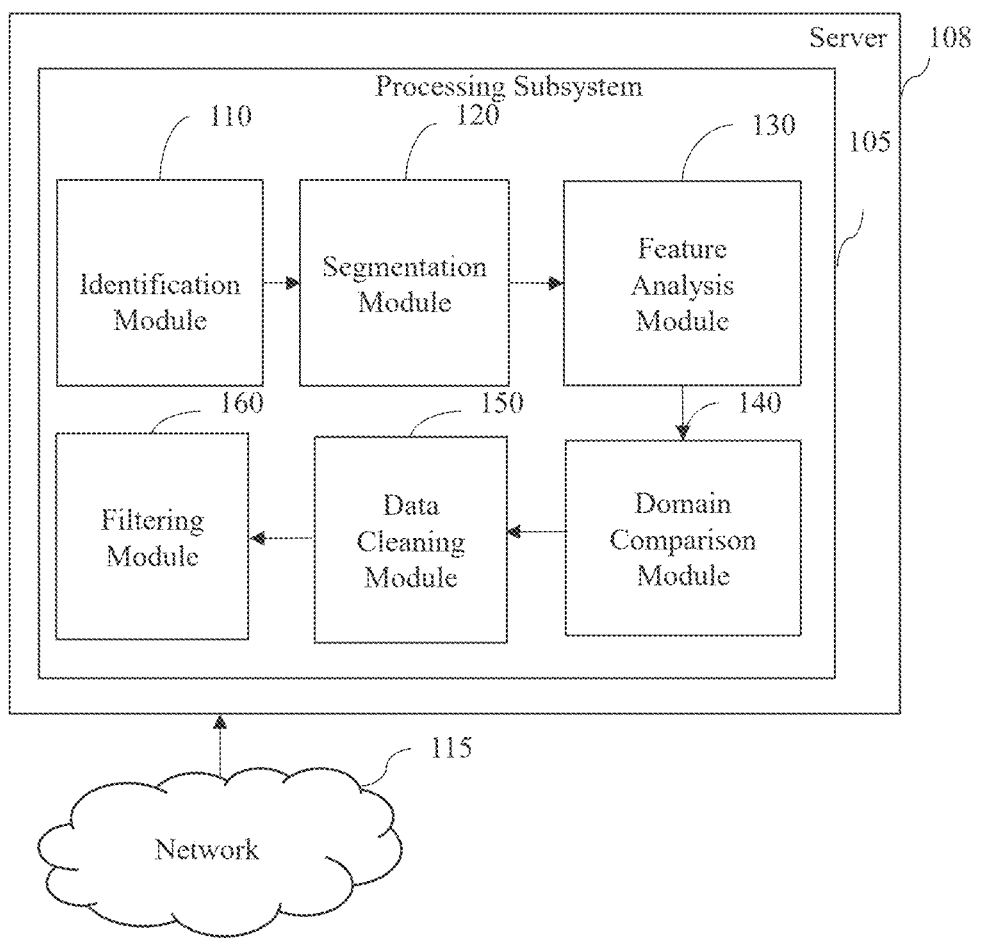

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to the field of predictive analytics and anomaly detection in equipment monitoring using deep learning models, and more particularly, a system and method for automatic selection of training of region selection for deep learning model. The system includes a processing subsystem hosted on a server. The processing subsystem is configured to execute on a network to control bidirectional communications among a plurality of modules. The processing subsystem includes an identification module which is configured to identify a shutdown of at least one equipment by analyzing operational data and exclude data from the buffer region for a predefined period before and after the shutdown, upon identifying one or more buffer regions around the shutdown. The processing subsystem also includes a segmentation module operatively coupled to the identification module. The segmentation module is configured to estimate one or more of operational regions of the corresponding one or more equipment within the data to analyze variance and identify an optimal number of clusters and divide the data into predefined operating regions using K-means clustering technique based on the estimated number of operational regions. Further, the processing subsystem includes a feature analysis module operatively coupled to the segmentation module. The feature analysis module is configured to: determine one or more top contributing tags for each operational regions by selecting a predetermined percentage of data points closest to a centroid of each operational regions and sort the absolute values of their medians; and to identify low and high values of contributing tags within the operational regions by analyzing at least one absolute value. The processing subsystem also includes a domain comparison module operatively coupled to the feature analysis module. The domain comparison module is configured to compare the one or more top contributing tags of each region with corresponding domain knowledge and exclude one or more regions whose contributing tags are associated with mapped failures based on the domain knowledge. Furthermore, the processing subsystem includes a data cleaning module operatively coupled to the domain comparison module. The data cleaning module is configured to determine a mean and standard deviation within the data upon eliminating erroneous data by recalculating statistical measures and eliminate outlier data points from the remaining data by applying statistical outlier detection methods. The processing subsystem further includes a filtering module operatively coupled to the data cleaning module. The filtering module is configured to apply a filter over the remaining region to refine the data further and consolidate regions that are within a predetermined distance to reduce the number of training ranges by merging adjacent regions.

FIG. 1 is a block diagram of a system 100 for training region selection for deep learning model. The system 100 includes a processing subsystem 105 hosted on a server 108. In one embodiment, the server 108 may include a cloud-based server. In another embodiment, parts of the server 108 may be a local server coupled to a user device (not shown in FIG. 1). The processing subsystem 105 is configured to execute on a network 115 to control bidirectional communications among a plurality of modules. In one example, the network 115 may be a private or public local area network (LAN) or Wide Area Network (WAN), such as the Internet. In another embodiment, the network 115 may include both wired and wireless communications according to one or more standards and/or via one or more transport mediums. In one example, the network 115 may include wireless communications according to one of the 802.11 or Bluetooth specification sets, or another standard or proprietary wireless communication protocol. In yet another embodiment, the network 115 may also include communications over a terrestrial cellular network, including, a global system for mobile communications (GSM), code division multiple access (CDMA), and/or enhanced data for global evolution (EDGE) network.

The system 100 includes an identification module 110 configured to identify a shutdown of at least one equipment by analyzing operational data and exclude data from the buffer region for a predefined period before and after the shutdown, upon identifying one or more buffer regions around the shutdown. More specifically, the identification module 110 may operate by continuously monitoring operational data associated with various equipment. This operational data may include sensor readings, performance metrics, and status indicators that reflect the real-time operational status of the equipment. In another embodiment, the identification module 110 may be designed to detect patterns or anomalies that indicate a shutdown event. A shutdown may be identified when the operational data exhibits specific characteristics such as zero operational activity, significant drops in performance metrics, or other predefined indicators of non-operation.

Further, upon identifying a shutdown event, the identification module 110 may determine buffer regions around the shutdown. The buffer region may be a predefined period extending both before and after the shutdown event. In one embodiment, the purpose of this buffer region may be to exclude potentially corrupted or irrelevant data that could adversely affect the training of deep learning models. Further, the predefined period may be set to a default value, such as seven days, but can also be adjusted based on user input or specific requirements of the equipment or operational context.

In another embodiment, once the buffer regions are determined, the identification module 110 may exclude the data within these regions from further analysis. This exclusion process may involve removing or marking the data points that fall within the buffer region, ensuring that they are not used in the subsequent steps of data processing and model training. By excluding this data, the system may prevent the inclusion of anomalous or non-representative data that could degrade the performance of the predictive models.

The system 100 also includes a segmentation module 120 operatively coupled to the identification module 110. The segmentation module 120 is configured to estimate one or more of operational regions of the corresponding one or more equipment within the data to analyze variance and identify an optimal number of clusters, and divide the data into predefined operating regions using K-means clustering technique based on the estimated number of operational regions.

In one embodiment, the segmentation module 120 may receive cleaned and refined data from the identification module 110, which may have already been identified and excluded data within buffer regions around equipment shutdowns. This integration ensures that the segmentation module 120 processes only high-quality, relevant data. Further, the segmentation module 120 may start by estimating the number of operational regions within the dataset. In one embodiment, the estimation may involve analyzing the variance within the data to determine the optimal number of clusters.

Further, the segmentation module 120 may employ the elbow method. The term 'elbow method' may be defined as a well-known technique in cluster analysis, to evaluate the variance explained as a function of the number of clusters. The optimal number of clusters may be identified at the point where adding more clusters yields diminishing returns in terms of explained variance, often visualized as an "elbow" in the graph of variance versus the number of clusters.

Once the optimal number of clusters is determined, the segmentation module 120 may apply the K-means clustering technique to divide the data into predefined operating regions. K-means clustering is a partitioning method that assigns each data point to one of K clusters based on the nearest mean, which serves as the cluster centroid.

Furthermore, the system 100 includes a feature analysis module 130 operatively coupled to the segmentation module 120. The feature extraction module is configured to determine one or more top contributing tags for each operational regions by selecting a predetermined percentage of data points closest to a centroid of each operational regions and sort the absolute values of their medians. The feature extraction module is also configured to identify low and high values of contributing tags within the operational regions by analyzing at least one absolute value.

In one embodiment, the feature analysis module 130 may receive segmented data from the segmentation module 120, which has already divided the data into predefined operational regions using the K-means clustering technique. This integration may ensure that the feature analysis module 130 processes data that has been effectively partitioned into distinct operational regions, each characterized by similar operational patterns.

Further, the feature analysis module 130 begins by determining the top contributing tags for each operational region. In such embodiment, the tags refer to specific parameters or sensor readings that may be monitored within the equipment. More specifically, for each operational region, the feature analysis module 130 may select a predetermined percentage of data points that are closest to the centroid of that region. The centroid may represent the mean or central point of the cluster, and the selected data points may be those that most accurately represent the typical behavior within that region. Further, the feature analysis module 130 may calculate the median values of the selected data points for each tag. In some embodiment, medians may be used as they are robust to outliers and provide a reliable measure of central tendency. Consequently, the feature analysis module 130 may sort the tags based on the absolute values of their medians. This sorting process may identify which tags have the most significant influence on the operational region, as tags with higher median values are considered to be the top contributors.

Furthermore, upon determining the top contributing tags, the feature analysis module 130 may identify the low and high values of these tags within each operational region. In one embodiment, the feature analysis module 130 may analyze the absolute values of the contributing tags to identify their low and high ranges. In some embodiments, absolute values may be used to ensure that both positive and negative deviations are considered, providing a comprehensive view of abnormal behavior. In such embodiment, the feature module may use predefined thresholds or statistical methods to define what constitutes low and high values for each tag. These thresholds may help in identifying abnormal operational conditions.

In one exemplary embodiment, the feature analysis module 130 may be configured to identify interactions between contributing tags across different regions to detect potential cross-regional anomalies. Additionally, feature analysis module 130 may generate a detailed report that may highlight the low and high values of these contributing tags within each operational region. This dual functionality may ensure comprehensive anomaly detection and provides valuable insights into the behavior of key parameters across different operational contexts.

The system 100 further includes a domain comparison module 140 operatively coupled to the feature analysis module 130. The domain comparison module 140 is configured to compare the one or more top contributing tags of each region with corresponding domain knowledge and exclude one or more regions whose contributing tags are associated with mapped failures based on the domain knowledge. In one embodiment, the domain knowledge may include at least one of assets, failures, and their mapping with contributing tags, failure recommendations, or a combination thereof.

In one embodiment, the domain comparison module 140 may receive data on the top contributing tags for each operational region from the feature analysis module 130.

This integration may ensure that the domain comparison module 140 processes data that has been meticulously analyzed to identify key contributing factors within each operational region. In one embodiment, the domain comparison module 140 may access a repository of domain knowledge, which includes detailed mappings of assets, known failures, contributing tags associated with these failures, and any failure recommendations. This repository can be updated continuously with new insights and data. The domain comparison module 140 may then compare the top contributing tags identified by the feature analysis module 130 with the tags listed in the domain knowledge. This comparison may identify any matches between the contributing tags of the operational regions and those associated with known failures.

Further, if the comparison reveals that the contributing tags of an operational region are associated with mapped failures, the domain comparison module 140 may exclude these regions from further analysis and training data. This exclusion may ensure that regions likely to contain data indicative of failure conditions are not used for training, thereby improving the reliability and accuracy of the predictive models.

Furthermore, the system 100 includes a data cleaning module 150 operatively coupled to the domain comparison module 140. The data cleaning module 150 is configured to determine a mean and standard deviation within the data upon eliminating erroneous data by recalculating statistical measures and eliminate outlier data points from the remaining data by applying statistical outlier detection methods.

In one embodiment, the data cleaning module 150 may begin functioning by recalculating statistical measures, specifically the mean and standard deviation, for the data received. More specifically, the data cleaning module 150 may first identify and eliminate any remaining erroneous data points within the dataset. In such an embodiment, erroneous data points may include incorrect sensor readings, noise, or any data that does not conform to expected patterns based on predefined criteria. Further, once the erroneous data is removed, the data cleaning module 150 may recalculate the mean and standard deviation. These statistical measures may provide a basis for understanding the central tendency and dispersion of the data, respectively. The recalculated mean may offer a more accurate representation of the data's central value, while the recalculated standard deviation quantifies the variation or spread in the dataset.

Furthermore, after recalculating the mean and standard deviation, the data cleaning module 150 may proceed to eliminate outlier data points. More specifically, the data points may be assigned a Z-score based on their distance from the mean, measured in terms of standard deviations. Points with a Z-score beyond a certain threshold (typically ±3) may be considered outliers. The data cleaning module 150 may calculate the interquartile range (IQR) and identify outliers as data points that fall below the first quartile minus 1.5 times the IQR or above the third quartile plus 1.5 times the IQR. This method may use a robust estimate of the median and median absolute deviation (MAD) to identify outliers, particularly effective for datasets with skewed distributions.

Consequently, the data points identified as outliers through the selected method are removed from the dataset. This step may ensure that the remaining data points are within a reasonable range of variability and do not unduly influence the results of subsequent analyses.

The system 100 further includes a filtering module 160 operatively coupled to the data cleaning module 150. The filtering module 160 is configured to apply a filter over the remaining region to refine the data further and consolidate regions that are within a predetermined distance to reduce the number of training ranges by merging adjacent regions.

In one embodiment, the filtering module 160 may receive a cleaned dataset from the data cleaning module 150. This dataset may have already undergone processes to eliminate erroneous data and outliers, ensuring that the data provided to the filtering module 160 is of high quality and ready for further refinement. The filtering module 160 may apply additional filters to the data to ensure that only the most relevant and accurate data points are retained for training. The filtering module 160 may define criteria for filtering the data further. These criteria may include specific ranges for values, the removal of noise, and any other parameters deemed necessary to enhance data quality.

Further, the filtering module 160 applies the defined filters to the dataset. This process may include Smoothing filters: Techniques such as moving averages or Gaussian filters to smooth out short-term fluctuations and highlight long-term trends. Noise reduction: techniques to remove any remaining noise or irrelevant variations in the data. Range-based filters: eliminating data points that fall outside predefined acceptable ranges.

Consequently, after filtering the data, the filtering module 160 consolidates regions that are within a predetermined distance to reduce the number of training ranges. Further, the filtering module 160 may calculate the distances between the centroids of adjacent regions. The predetermined distance threshold may be set based on domain knowledge and specific application requirements. Further, the regions whose centroids are within the predefined distance may be merged. In one embodiment, this step may include combining the data points from the adjacent regions into a single region, updating the centroid of the newly formed region to reflect the mean position of the combined data points and adjusting any statistical measures (mean, standard deviation) to account for the merged data.

In one exemplary embodiment, the system 100 may include a recommendation module which may suggest maintenance actions based on the analysis of training regions and domain knowledge. This module may work with other system components to analyze refined data, identifying key parameters and patterns using machine learning. By accessing a repository of historical failure data and maintenance guidelines, the recommendation module may integrate current operational data with past insights. The module may predict potential failures and may generate specific preventive maintenance actions, prioritizing them based on severity and equipment criticality. This proactive approach may reduce downtime, prevent major failures, and extends equipment lifespan, all while minimizing human error and enhancing maintenance efficiency through automation.

Figure 2:
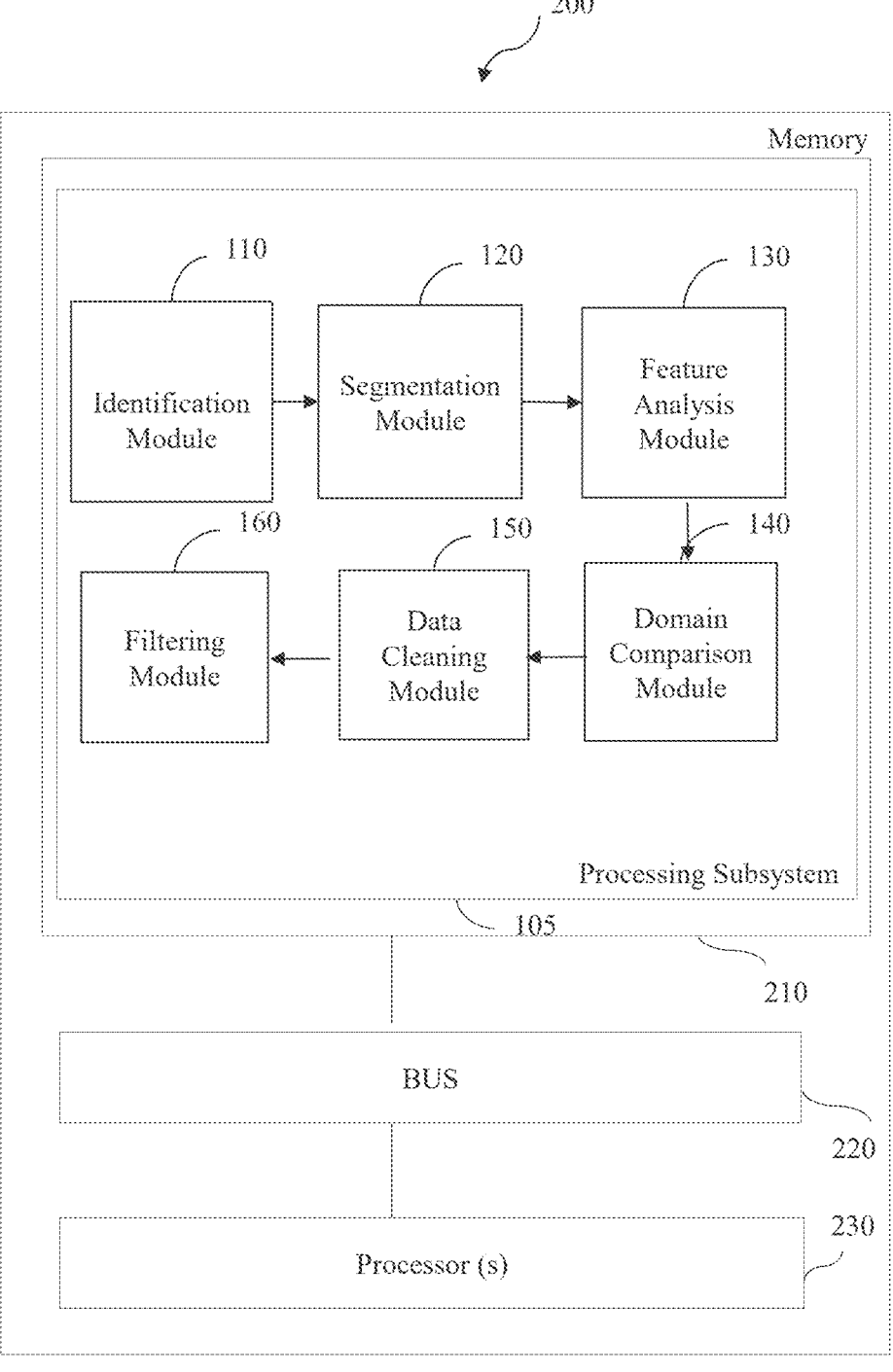
FIG. 2 is a block diagram of a computer or a server in accordance with an embodiment of the present disclosure.

FIG. 2 is a block diagram of a computer or a server in accordance with an embodiment of the present disclosure. The server 200 includes processor(s) 230, and memory 210 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of executable program which instructs the processor 230 to perform the method steps illustrated in FIG. 1. The memory 210 includes a processing subsystem 105 of FIG. 1. The processing subsystem 105 further has following modules: an identification module 110, a segmentation module 120, a feature analysis module 130, a domain comparison module 140, a data cleaning module 150, a filtering module 160 and a recommendation module, each with distinct functions that enhance the overall process of training region selection for deep learning models used in equipment monitoring.

The identification module 110 is configured to identify equipment shutdowns by analyzing operational data and exclude data from buffer regions before and after the shutdown. The segmentation module 120, utilizing machine learning techniques such as the elbow method and K-means clustering, estimates the number of operational regions and divides the data accordingly. The feature analysis module 130 identifies key contributing tags within each region, determines their low and high values, and detects potential cross-regional anomalies, generating detailed reports. The domain comparison module 140 integrates historical data and domain knowledge, comparing top contributing tags with mapped failures to exclude unreliable regions. The data cleaning module 150 recalculates statistical measures to eliminate erroneous data and outliers, ensuring high-quality data for further analysis. The filtering module 160 refines the remaining data by applying filters and consolidating adjacent regions to reduce the number of training ranges. Finally, the recommendation module uses AI to analyze training regions and domain knowledge, predict potential failures, and generate prioritized maintenance recommendations, improving equipment reliability and maintenance efficiency.

The bus 220 as used herein refers to internal memory channels or computer network that is used to connect computer components and transfer data between them. The bus 220 includes a serial bus or a parallel bus, wherein the serial bus transmits data in bit-serial format and the parallel bus transmits data across multiple wires. The bus 220, as used herein, may include but not limited to, a system bus, an internal bus, an external bus, an expansion bus, a frontside bus, a backside bus and the like.

FIG. 3 illustrates a flow chart representing the steps involved in a method for training region selection for deep learning model. The methos 300 includes identifying a shutdown of at least one equipment by analyzing operational data and exclude data from the buffer region for a predefined period before and after the shutdown, upon identifying one or more buffer regions around the shutdown in step 310. More specifically, method 300 includes analyzing operational data to detect instances of equipment shutdowns. Upon identifying a shutdown event, data from the buffer region surrounding the shutdown is excluded to ensure accurate analysis.

The method 300 also includes estimating one or more of operational regions of the corresponding one or more equipment within the data for analysing variance and identifying an optimal number of clusters, and dividing the data into predefined operating regions using K-means clustering technique in step 320. More specifically, the method 300 estimates operational regions within the data by analyzing variance and determining an optimal number of clusters using the K-means clustering technique. The data is then divided into predefined operating regions based on these clusters.

Furthermore, the method 300 includes determining one or more top contributing tags for each operational regions by selecting a predetermined percentage of data points closest to a centroid of each operational regions and sorting the absolute values of their medians in step 330. More specifically, the method 300 includes identifying key contributing tags within each operational region. A predetermined percentage of data points closest to the centroid of each region is selected, and the absolute values of their medians are sorted to determine the top contributing tags.

The method 300 also includes identifying low and high values of contributing tags within the operational regions by analyzing at least one absolute value in step 340. More specifically, the method 300 identifies the low and high values of contributing tags within the operational regions. By analyzing at least one absolute value, anomalies can be detected, indicating potential issues or abnormalities.

Furthermore, the method 300 includes comparing the one or more top contributing tags of each region with corresponding domain knowledge, and excluding one or more regions whose contributing tags are associated with mapped failures based on the domain knowledge in step 350. More specifically, the method 300 includes comparing the top contributing tags of each region with domain knowledge. Regions associated with contributing tags mapped to known failures are excluded from further analysis, based on the domain knowledge.

The method 300 also includes determining a mean and standard deviation within the data upon eliminating erroneous data by recalculating statistical measures and eliminating outlier data points from the remaining data by applying statistical outlier detection methods in step 360. More specifically, in this step, statistical measures such as mean and standard deviation are recalculated within the data to ensure accuracy. Erroneous data points are eliminated, and outliers are detected and removed using statistical outlier detection methods.

Further, the method 300 includes applying a filter over the remaining region for refining the data further and consolidating regions that are within a predetermined distance for reducing the number of training ranges by merging adjacent regions in step 370. More specifically, the remaining data is further refined by applying filters. Regions within a predetermined distance are consolidated to reduce the number of training ranges, enhancing the efficiency of the system.

Various embodiments of the system and method for automatic selection of training of region selection for deep learning model offer several advantages in the realm of equipment monitoring and predictive analytics. By employing a sophisticated combination of data analysis techniques and domain knowledge integration, the system enhances the accuracy and efficiency of training region selection for deep learning models used in equipment monitoring. One notable advantage is the system's ability to accurately identify equipment shutdowns and exclude buffer region data, ensuring that only relevant operational data is utilized for analysis. This targeted approach reduces noise and improves the quality of insights derived from the data.

Furthermore, the system utilizes advanced machine learning algorithms to estimate operational regions and divide the data into predefined operating regions. This not only streamlines the analysis process but also enables the system to adapt to varying operational conditions and complexities effectively. Additionally, by leveraging domain knowledge, the system can intelligently compare contributing tags with known failure patterns, enabling proactive identification and mitigation of potential issues.

Moreover, the system ensures data integrity by recalculating statistical measures, eliminating erroneous data, and detecting outliers. This rigorous data cleaning process enhances the reliability of the analysis results and reduces the risk of false positives or erroneous conclusions. Additionally, the system refines the data by applying filters and consolidating regions, ultimately reducing the number of training ranges and enhancing the efficiency of the system.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field-programmable gate arrays (FPGAs), or any other equivalent integrated or discrete logic circuitry, as well as any combinations of such components. The term "processor" or "processing subsystem" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for training region selection for deep learning model comprising:

a processor; and a memory coupled to the processor, wherein the memory comprises a processing subsystem configured to be executed by the processor, wherein the processing subsystem is hosted on a server and configured to execute on a network to control bidirectional communications among a plurality of modules comprising:

an identification module configured to:

identify a shutdown of at least one equipment by analyzing operational data associated with the at least one equipment, wherein the operational data comprises sensor readings, performance metrics and status indicators collected during real-time operation of the at least one equipment;

identify a buffer region around the detected shutdown, wherein the buffer region comprises a predefined period immediately preceding and immediately following the detected shutdown; and obtain a first data from the operational data by excluding a data corresponding to the buffer region;

a segmentation module operatively coupled to the identification module, and configured to:

determine an optimal number of clusters for the first data using an elbow method, and partition optimal number of clusters into a predefined operating regions using K-means clustering technique;

a feature analysis module operatively coupled to the segmentation module, and configured to:

select, for each operating region, a predetermined percentage of data points closest to a centroid of the each operating region;

compute corresponding median values of tags associated with the selected data points;

identify top-contributing tags for the each operating region by sorting the tags based on corresponding absolute values of the corresponding computed median values; and identify low and high values of the top-contributing tags within the each operating region based on the corresponding absolute values;

a domain comparison module operatively coupled to the feature analysis module, and configured to compare the top-contributing tags of the each operating region with corresponding domain knowledge, and exclude one or more of the operating regions whose top-contributing tags are associated with mapped failures based on the corresponding domain knowledge from the predefined operating regions to obtain remaining operating regions;

a data cleaning module operatively coupled to the domain comparison module, and configured to determine a mean and standard deviation within the remaining operating regions upon eliminating erroneous data by recalculating statistical measures, and eliminate outlier data points from the remaining operating regions by applying statistical outlier detection methods to obtain cleansed operating regions; and a filtering module operatively coupled to the data cleaning module, and configured to apply a filter over the cleansed operating regions to refine the cleansed operating regions further and consolidate operating regions among the cleansed operating regions that are within a predetermined distance to reduce a number of training regions.

2. The system as claimed in claim 1, wherein the predefined number of days for excluding data before and after the shutdown event is at least seven days.

3. The system as claimed in claim 1, wherein the corresponding domain knowledge comprises at least one of assets, failures, and their mapping with the tags, failure recommendations, or a combination thereof.

4. The system as claimed in claim 1, wherein the feature analysis module is configured to generate a report detailing the low and high values of the top-contributing tags within the each operational region.

5. The system as claimed in claim 1, wherein the feature analysis module is configured to identify interactions between top-contributing tags across different operating regions from the predefined operating regions to detect potential cross-regional anomalies.

6. The system as claimed in claim 1, wherein the data cleaning module is configured to eliminate the outlier data points from the remaining operating regions after excluding the operating regions associated with the mapped failures.

7. The system as claimed in claim 1, wherein the processing submodule comprises a recommendation module configured to suggest maintenance actions based on the analysis of the training regions and the corresponding domain knowledge.

8. A method for training region selection for deep learning model, comprising:

identifying, by an identification module of a processing subsystem, a shutdown of at least one equipment by analyzing operational data associated with the at least one equipment, wherein the operational data comprises sensor readings, performance metrics and status indicators collected during real-time operation of the at least one equipment;

identifying a buffer region around the detected shutdown, wherein the buffer region comprises a predefined period immediately preceding and immediately following the detected shutdown; and obtaining a first data from the operational data by excluding a data corresponding to the buffer region;

determining an optimal number of clusters for the first data using an elbow method, and partition optimal number of clusters into a predefined operating regions using K-means clustering technique;

selecting, for each operating region, a predetermined percentage of data points closest to a centroid of the each operating region;

computing corresponding median values of tags associated with the selected data points;

identifying top-contributing tags for the each operating region by sorting the tags based on corresponding absolute values of the corresponding computed median values;

identifying low and high values of the top-contributing tags within the each operating region based on the corresponding absolute values;

comparing, by a domain comparison module of a processing subsystem, the top-contributing tags of the each operating region with corresponding domain knowledge, and excluding one or more of the operating regions whose top-contributing tags are associated with mapped failures based on the corresponding domain knowledge from the predefined operating regions to obtain remaining operating regions;

determining, by a data cleaning module of a processing subsystem, a mean and standard deviation within the remaining operating regions upon eliminating erroneous data by recalculating statistical measures, and eliminating outlier data points from the remaining operating regions by applying statistical outlier detection methods to obtain cleansed operating regions; and applying, by a filtering module of a processing subsystem, a filter over the cleansed operating regions for refining the cleansed operating regions further and consolidating cleansed operating regions regions that are within a predetermined distance for reducing a number of training regions.

9. The method as claimed in claim 8, comprises generating, by the identification module, an alert when the shutdown of equipment is detected.

10. The method as claimed in claim 8, comprises displaying, by the segmentation module, a visual representation of the predefined operational regions identified using the K-means clustering technique.

\* \* \* \* \*